United States Patent Office 2,954,315
Patented Sept. 27, 1960

2,954,315
AMINO ACID SUBSTITUTES

Richard S. Gordon, St. Louis, Mo., and Robert J. Wineman, Concord, Mass., assignors to Monsanto Chemical Company, St. Louis, Mo., a corporation of Delaware No Drawing. Filed Dec. 15, 1958, Ser. No. 780,225

6 Claims. (Cl. 167—22)

This invention relates to the control of plant infections and to the improvement of normal growth by the elimination of fungus, virus, bacteria and other parasitic infections and the protection of plants against such parasites.

It is well known that living organisms require methionine for their normal development. Furthermore, it is well known that the molecular structure of methionine is critical and essential to the ability of the organism to assimilate and use it as a nutrient. Many homologs and analogues of methionine, especially where the variation is in a substituent on the α-carbon atom, are also nutrients, being capable of conversion by the metabolism of the organism to methionine or other readily assimilable compound. It is also known that substantial variation in the structure will result in compositions which cannot be assimilated and are thereby useless as nutrients. Furthermore, it is known that there are other homologs and analogues of methionine wherein the differences in the molecular structure are such that they can be assimilated by living organisms, but with toxic effects through an anti-metabolic activity.

The nature and mechanism of the anti-metabolic activity is not completely established. It is believed that this toxic effect may be due to the incorporation of the unnatural molecular grouping into proteins thereby rendering the proteins unavailable to the organism in its normal life process. It may additionally, or alternatively, be due to the chemical combination of the amino acid analogue with enzymes, thereby rendering them incapable of assimilating methionine or other amino acids in accordance with their normal function. Irrespective of the mechanism which develops the toxicity, such near homolog or analogue has the ultimate effect in destroying the organism, if used to any appreciable extent.

It is the fundamental purpose of this invention to provide novel plant chemotherapeutic agents. A further purpose of this invention is to provide means of eliminating, controlling or preventing attack of plants by fungus, bacteria, virus or other parasitic organisms. A further purpose of the invention is to provide a means of producing more vigorous plants with increases in crop yields. Other purposes will be apparent from the following descripiton of the invention.

It has now been discovered that methionine analogues can be used to treat plants which are, or may be, hosts to fungus, virus, bacteria or other parasitic organisms. Although plants require methionine and may under some circumstances be destroyed or injured by the methionine analogues, they differ from the lower forms of life in their ability to synthesize all or most of their methionine requirements. This may possibly be related to their ability to withstand to a substantial degree the toxic effects produced by the methionine analogues, which have the ability to destroy the fungus, bacteria and virus infections.

The effect of the methionine analogues on the parasites has been found to be systemic with respect to the plant; and irrespective of the part of the plant treated with methionine analogue, the toxicant may be translocated to the site of the infection, to destroy or inhibit the parasitic organism. Thus the methionine analogue may be sprayed on the leaves and stems, or it may be introduced into the soil to be absorbed by the plant through the roots. In either case the methionine analogue becomes available for absorption and destructive assimilation by the infectious organism.

Although the toxic analogues of methionine may be utilized by the plants without serious effect and subsequently released by the metabolic decomposition of the protein, it is also believed that free methionine and free methionine analogues are present to a substantial extent in the plant fluids, and through this method is circulated to all portions of the growing plant. It is believed that the parasites draw a substantial part of their methionine requirements from this source. If the methionine analogues are present in the plant fluids, the parasitic organism may take in sufficient of the toxic compound to render itself incapable of assimilating methionine, which effect may be due to the loss of vital enzymes, or by other mechanisms which destroy the ability of the organism to assimilate essential amino acids.

Compositions which have been found useful in the practice of this invention are the methionine analogues and homologs having the following structural formula:

$$X-CH_2-CH_2-Y-\overset{O}{\underset{\parallel}{C}}M$$

wherein X is a radical selected from the group consisting of $C_2H_5-S-$, $CH_3O-$, $C_2H_5O-$,

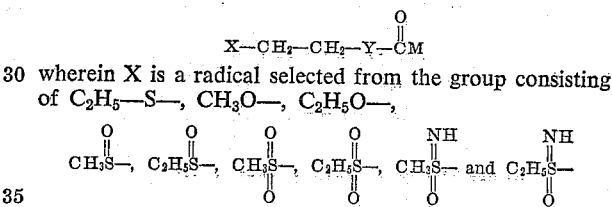

wherein M is a radical selected from the group consisting of $-NH_2$, $-OH$, $ONH_4$, $$\frac{OZ}{V}$$

of which Z is a metal of valence V, and $-OR$ of which R is an alkyl radical having up to three (3) carbon atoms; and wherein Y is a symbol representing a divalent radical of the class consisting of

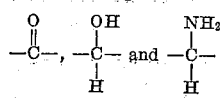

The "anion" in the above definition of the useful methionine analogues is a negatively charged atom or group of atoms which separates as a free ion in the presence of water.

Suitable compounds conforming to the above structural formula and capable of being used in the practice of the present invention are:

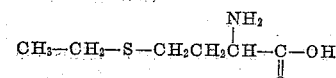

2-amino-4-(ethylthio)butyric acid

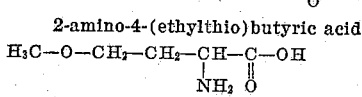

2-amino-4-methoxybutyric acid

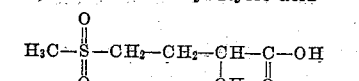

2-amino-4-(methylsulfonyl)butyric acid

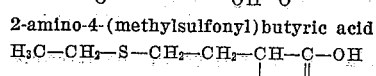

4-(ethylthio)-2-hydroxybutyric acid

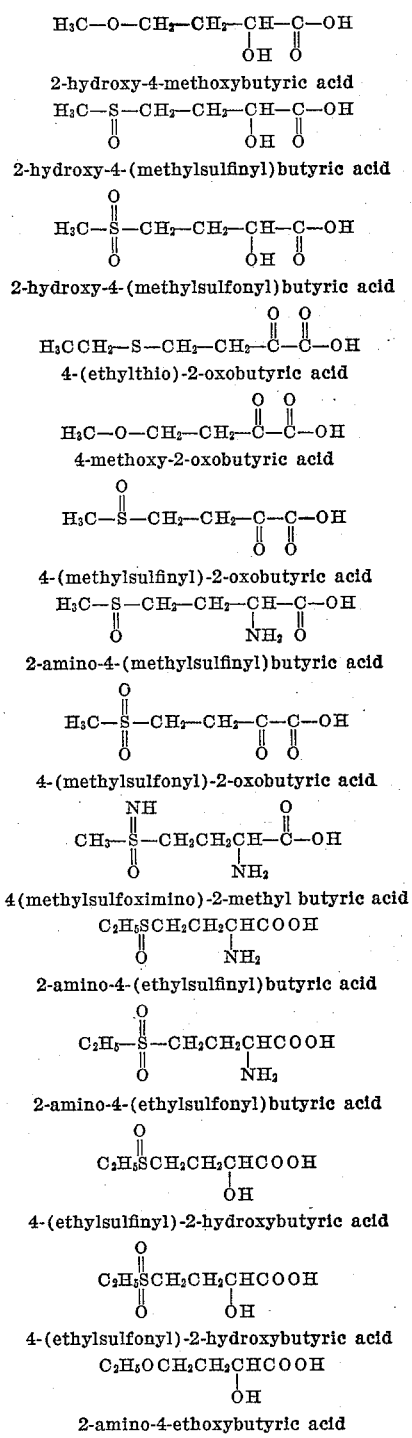

2-hydroxy-4-methoxybutyric acid 2-hydroxy-4-(methylsulfinyl)butyric acid 2-hydroxy-4-(methylsulfonyl)butyric acid 4-(ethylthio)-2-oxobutyric acid 4-methoxy-2-oxobutyric acid 4-(methylsulfinyl)-2-oxobutyric acid 2-amino-4-(methylsulfinyl)butyric acid 4-(methylsulfonyl)-2-oxobutyric acid 4(methylsulfoximino)-2-methyl butyric acid 2-amino-4-(ethylsulfinyl)butyric acid 2-amino-4-(ethylsulfonyl)butyric acid 4-(ethylsulfinyl)-2-hydroxybutyric acid 4-(ethylsulfonyl)-2-hydroxybutyric acid 2-amino-4-ethoxybutyric acid All of these acids, their amides, lower alkyl esters, the ammonium salt, and salts of the metals Na, K, Ca, Cu, Fe, Hg, Mn, Pb, Cd, Co, Ni and Cr, are useful antimetabolites in the control of parasitic infections in plants.

The plant chemotherapeutic agents may be used by spraying the leaves, stems or other exposed portions of the plant with a solution or other dispersion of the compound, or by the similar treatment of the soil in which the plant is growing.

Plants which are being transplanted can be effectively protected against fungus by dipping the roots in solutions or dispersions of the methionine analogues prior to replanting.

The useful concentrations of the treating agents are from .001 percent to 0.5 percent of the treating formulation depending on the avenue of treament and applied in such quantities that the toxic limit of the particular plant is not exceeded. In the usual treatment of plants with fungicides, or other plant chemotherapeutic agents, it is customary to spray the foliage with a solution to the saturation point, that is to the point where the excess treating solution drips or runs off of the leaves. Thus the quantity of reactive agent applied may not be significant, since the amount absorbed by the leaves will be a function of the concentration of active agent in the solution. It is known, however, that the lower limit of concentration is very small and that traces of the active agent deposited on the leaves will have some effect on fungus, virus or destructive bacteria within the plant or on the plant surface. The upper limit of the concentration will be dependent upon the type and size of the plant being treated. In view of the fact that the parasitic organisms are very small relative to their host, and they are completely or nearly completely dependent for methionine upon the host, which can synthesize its methionine, they are much more sensitive to the toxic effects. Thus it is not difficult to select a concentration which will be extremely effective in controlling the parasites without inflicting injury on the plant.

Further details of the practice of this invention and the beneficial result achieved thereby are set forth with respect to the following specific examples.

*Example 1*

Two to three inch tomato plants were divided into three groups. One group was placed in a solution of 10 parts per million of 2-amino-4-(ethylthio)butyric acid, another group was placed in a solution of 100 parts per million of the same methionine analogue, and the third group was placed in distilled water. After forty-eight hours the plant roots were washed to remove excess methionine analogue and then were dipped in a culture of Fusarium. The tomatoes were then planted in pots and placed on a greenhouse bench and permitted to grow for twenty-one days. The tomato plants which were not treated with methionine analogue were completely dead, whereas the tomato plants which has been pretreated with 2-amino-4-(ethylthio)butyric acid showed no signs of the disease, fusarium wilt.

*Example 2*

On week old wheat seedlings, which were two to three inches tall, were placed in an incubator and dusted with spores of the fungus, *Puccinia rubigo-vara tritici*. After twenty-four hours in the incubator they were removed and permitted to grow for three days at which time all plants showed evidence of infection. The infected wheat seedlings were then divided into four groups. The first three were then sprayed with 0.5, 0.25 and 0.1 percent solutions of 2-amino-4-(ethylthio)butyric acid. The fourth group was untreated. After five days the wheat plants were examined. It was found that the wheat treated with 0.5, 0.25 and 0.1 percent solutions were infected with slight traces of wheat rust. The untreated part was found to have abundant infections of wheat rust.

*Example 3*

The procedure of Example 2 was repeated except that the methionine analogue, 2-hydroxy-4-(ethylthio)butyramide was used. The wheat seedlings were divided into five groups and four different levels of application were used, 0.5, 0.25, 0.1 and 0.05 percent solutions of the methionine analogue. The fifth group was used as the control. At the conclusion of the experiment, it was found that the wheat treated with 0.5 and 0.25 percent solutions were entirely free of rust. The wheat treated with 0.1 and 0.05 percent solutions were found to be infected by traces of wheat rust. The untreated wheat was heavily infected.

*Example 4*

Bean plants were permitted to grow in flower pots until approximately six inches tall. The plants were placed in an incubator and dusted with spores of bean rust (*Uromyces appendiculatus*). After twenty-four hours they were removed from the incubator and placed in the greenhouse where they were permitted to grow for three days. The plants were divided into four groups, the first three groups being treated with 0.5, 0.25 and 0.1 percent solutions of 2-hydroxy-4-(ethylthio)butyramide. The fourth group remained untreated. After 10 days the growth of the bean rust was observed. It was found that the plants sprayed with 0.5 percent solution were infected, the group sprayed with 0.25 percent solution was slightly infected with bean rust, and the plants sprayed with 0.1 percent were moderately infected with bean rust. The plants which were not sprayed were heavily infected by bean rust.

*Example 5*

40 parts of sodium hydroxide, in a 50% by weight water solution, are added to 680 parts of water and the mixture is stirred to a uniform solution. 163 parts of ethionine are added slowly to the stirred solution at 25–30° C. After the solution is complete, a zinc chloride solution containing 70 parts of zinc chloride dissolved in 53 parts of water and at a temperature of 50° C., is added thereto over a period of 30 minutes. The stirring of the reaction mixture is continued for about 15 minutes after the addition of the zinc chloride is completed. The reaction mixture is then filtered to separate the precipitated zinc salt of ethionine, which is then washed with water and thereafter dried at 100–110° C. to yield 198 parts of zinc 2-amino-4(ethylthio)butyrate, M.P. 240–70° C. (gradual decomposition) and analyzing 16.95% S (calc'd. S for $C_{12}H_{24}N_2O_4S_2Zn$, 16.45%).

*Example 6*

To a stirred solution of ethionine, 16.3 parts in 400 parts of water, a solution of 9.96 parts of cupric acetate monohydrate in 150 parts of water is added over a 15-minute period. The precipitated copper salt is isolated by filtration and dried at 75° C., yielding 18.7 parts of cupric 2-amino-4-(ethylthio)-butyrate having a M.P. 250–70° C. (gradual decomposition) and analyzing 16.47% S (calc'd. S for $C_{12}H_{24}CuN_2O_4S_2$, 16.52%).

*Example 7*

Employing the procedure of Example 6, the compounds listed in the following table (column 3) are obtained in good yield by replacing cupric acetate monohydrate with an equimolecular amount of the heavy metal salt in column 2 and reacting it with a stoichiometrically equivalent amount of the organic acid in column 1.

*Example 8*

Into a glass-lined reactor, fitted with a brine cooled reflux condenser connected to a caustic scrubber, was charged 109.5 parts of 3(ethylthio)propionaldehyde, followed by 0.248 part of pyridine. The mixture was agitated and 26.44 parts of liquid hydrogen cyanide were added to the reactor over a period of 2 hours while the temperature was maintained at 30–45° C. by cooling. After all the hydrogen cyanide was added, the mixture was stirred for 15 minutes and a vacuum of 20–50 mm. absolute pressure was applied through the caustic scrubber for a period of 30 minutes to remove the excess hydrogen cyanide. 133.2 parts of 4(ethylthio)-2-hydroxybutyronitrile were obtained at this point.

To the nitrile was added 72.9 parts of 75% sulfuric acid over a period of 2 hours, the temperature being 35° C. at the start of the adidtion and maintained by external cooling during the bulk of the addition at a temperature of approximately 45° C. The mixture was stirred for 15 minutes, 242 parts of dilution water were added and the mixture heated to its boiling point of approximately 104–105° C. The mixture was boiled for one hour and 52.3 parts of distillate water which contained hydrogen cyanide and oil were collected and discarded. The reaction mass was cooled to 20° C. and the phases were allowed to separate. The lower aqueous phase was discarded. The arganic phase contained crude 4(ethylthio)-2-hydroxybutyric acid, about 152 parts.

The crude organic acid was stirred at 25–30° C. and a 20% solution of sodium hydroxide was added to bring the pH up to 2.5–3.0. A solution of 104 parts of cupric sulfate pentahydrate in 225 parts of water was added slowly to the stirred butyric acid solution. A 20% solution of sodium hydroxide was then added to bring the pH back up to 2.5–3.0 and the mixture was stirred for 30 minutes. The salt precipitated and the solution was filtered. The filtrate was washed and dried at 100–110° C. and yielded 152 parts of cupric 4(ethylthio)-2-hydroxybutyrate, M.P. 195–200° C. and analyzing 16.16% S (calc'd. S for $C_{12}H_{22}CuO_6S_2$, 16.44%).

*Example 9*

A solution of zinc acetate dihydrate, 22 parts in 100 ml. of water, was added to a stirred solution of 4(ethylthio)-2-hydroxybutyric acid and the mixture was concentrated by heating for 1 hour at 70–75° C. After cooling to 10° C., the precipitated product was filtered off and dried at 75° C. to a constant weight to yield 32.5 parts of zinc 4(ethylthio)-2-hydroxybutyrate, M.P. 240–45° C. and analyzing 16.32% S (calc'd. S for $C_{12}H_{22}O_6S_2Zn$, 16.37%).

| Reactants | | Product |
| --- | --- | --- |
| Column 1 | Column 2 | Column 3 |
| 2-amino-4(ethylthio)-butyric acid | Ferric Acetate | Ferric 2-amino-4(ethylthio)butyrate. |
| Do | Cadmium Acetate | Cadmium 2-amino-4(ethylthio)butyrate. |
| Do | Cobaltous Acetate | Cobaltous 2-amino-4(ethylthio)butyrate. |
| Do | Chromic Acetate | Chromic 2-amino-4(ethylthio)butyrate. |
| Do | Lead Acetate | Lead 2-amino-4(ethylthio)butyrate. |
| Do | Mercuric Acetate | Mercuric 2-amino-4(ethylthio)butyrate. |
| Do | Manganous Acetate | Manganous 2-amino-4(ethylthio)butyrate. |
| Do | Nickel Acetate | Nickel 2-amino-4(ethylthio)butyrate. |
| 4(ethylthio)-2-hydroxybutyric acid | Ferric Acetate | Ferric 4(ethylthio)-2-hydroxybutyrate. |
| Do | Cadmium Acetate | Cadmium 4(ethylthio)-2-hydroxybutyrate. |
| Do | Cobaltous Acetate | Cobaltous 4(ethylthio)-2-hydroxybutyrate. |
| Do | Chromous Acetate | Chromous 4(ethylthio)-2-hydroxybutyrate. |
| Do | Lead Acetate | Lead 4(ethylthio)-2-hydroxybutyrate. |
| Do | Mercuric Acetate | Mercuric 4(ethylthio)-2-hydroxybutyrate. |
| Do | Manganous Acetate | Manganous 4(ethylthio)-2-hydroxybutyrate. |
| Do | Nickel Acetate | Nickel 4(ethylthio)-2-hydroxybutyrate. |
| 4(ethylthio)-2-oxobutyric acid | Zinc Acetate | Zinc 4(ethylthio)-2-oxobutyrate. |
| Do | Cupric Acetate | Cupric 4(ethylthio)-2-oxobutyrate. |
| Do | Ferric Acetate | Ferric 4(ethylthio)-2-oxobutyrate. |
| Do | Cadmium Acetate | Cadmium 4(ethylthio)-2-oxobutyrate. |
| Do | Cobaltous Acetate | Cobaltous 4(ethylthio)-2-oxobutyrate. |
| Do | Chromic Acetate | Chromic 4(ethylthio)-2-oxobutyrate. |
| Do | Lead Acetate | Lead 4(ethylthio)-2-oxobutyrate. |
| Do | Mercuric Acetate | Mercuric 4(ethylthio)-2-oxobutyrate. |
| Do | Manganous Acetate | Manganous 4(ethylthio)-2-oxobutyrate. |
| Do | Nickel Acetate | Nickel 4(ethylthio)-2-oxobutyrate. |

The heavy metal salt modification of our invention can be applied to plants (the term "plants" includes plant parts, e.g., seeds) directly or in an inert medium as a dust in admixture with a powdered solid carrier or as an aqueous suspension in water, or they can be applied in admixture with small amounts of a surface active agent which acts as a wetting agent for the chemical.

The solid formulations, frequently referred to as "dusts," may contain, in addition to the active ingredient, diluents or extenders which render the compositions permanently dry and free flowing. Effective solid diluents, preferably pulverulent or granular in form so as to be effective carriers for the active ingredient, are the natural clays, such as china clays, the bentonites and the attapulgites; other minerals in natural state, such as talc, pyrophyllite, quartz, diatomaceous earth, fuller's earth, chalk and rock phosphate; and the chemically modified minerals, such as acid washed bentonite, precipitated calcium phosphate, precipitated calcium carbonate, the colloidal silica. These diluents may represent a substantial portion, for example 50 to 98 percent by weight, of the entire formulation as applied to the plant.

Preferably, the insoluble metal salts are applied as an aqueous spray in suspension in water, utilizing a surface active agent to disperse and suspend the fungicide. Examples of such surface active agents which can be employed in forming dispersions include salts of the alkyl and alkylaryl sulfonates, such as du Pont MP–189 and Nacconol–NR, alkyl sulfate, such as Dreft, the alkylaryl polyester alcohols, such as Triton X–100, the fatty acid esters of polyhydric alcohols, such as Span, and the ethylene oxide addition products of such esters, as for example Tween. Still other surface active agents can be employed, the above merely showing a representative list of the more common materials. Generally, the surface active agents will constitute only a minor portion of the formulation as used, as, for example, less than 10 percent and frequently as low as 0.05 percent.

Plants which are being transplanted can be effectively protected against fungus by dipping the roots in suspensions of the compounds prior to replanting. In addition, these compounds may be introduced into the soil to be absorbed through the roots, such application being made at rates of from 1 to 4 pounds per acre and preferably at rates of from 1.5 to 2.5 pounds per acre.

Both the solid and liquid formulations above described are useful in the application of fungicides because they facilitate the uniform distribution and aid in the destruction of the parasitic organisms by maintaining the active ingredient in a form which enables the plant to utilize its fungicidal properties.

The effectiveness of the heavy metal salts as fungicides is illustrated by the following examples:

*Example 10*

An aqueous suspension of 625 parts per million cupric 4(ethylthio)-2-hydroxybutyrate was prepared, incorporating therein a small amount of a commercial surface active dispersing agent known as Tween 20 (polyoxyethylene sorbitan monolaurate, as sold by the Atlas Powder Company). The solution was sprayed on tomato plants, Bonny Best, which were 6 to 8 inches high and which contained at least 4 true leaves. When the treated plants were sufficiently dry, the plants, together with the untreated plants, were placed in a moist chamber at 70° F. and sprayed with a spore suspension of *Alternaria solani*, the fungus responsible for a serious leaf blight disease of this crop. After 36 hours, the plants were removed to a greenhouse bench. After 3 days in the green house, the effectiveness of the cupric 4(ethylthio)-2-hydroxybutyrate was determined by counting the lesions on the second, third, and fourth leaves and the percent disease, based on the inoculated, untreated controls, was calculated. It was found that 100% control was obtained, as the untreated plants averaged 202 lesions per plant, while the treated had none.

The above procedure was repeated using a solution containing 312 parts per million, and 100% control was still obtained.

*Example 11*

The procedure used in Example 10 was repeated using 1250 parts per million of cupric 2-amino-4(ethylthio) butyrate and 95% control was obtained.

The procedure was repeated using the 625 p.p.m. of cupric 2-amino-4(ethylthio)butyrate against *Colletotrichum lagenarium*, the causal agent of cucumber anthracnose, on cucumber plants and 96% control was obtained.

*Example 12*

The procedure used in Example 10 was repeated using 312 p.p.m. of zinc 2-amino-4(ethylthio)butyrate and 97% control was obtained.

The procedure was repeated using 625 p.p.m. against *Colletotrichum lagenarium* on cucumber plants and 100% control was obtained.

*Example 13*

Two- to three-inch tomato plants were divided into two groups. One group was placed in a solution of 100 p.p.m. of zinc 4(ethylthio)-2-hydroxybutyrate and the second group was placed in distilled water. After 48 hours, the plant roots were washed to remove the excess chemical and then were dipped in a culture of *Fusarium lycopersici* (tomato wilt). The tomatoes were then planted in pots and placed on a green house bench and permitted to grow for 21 days. The tomato plants which were not treated with zinc 4(ethylthio)-2-hydroxybutyrate were completely dead, whereas the plants which were pretreated with 100 parts per million of zinc 4(ethylthio)-2-hydroxybutyrate showed no signs of disease.

*Example 14*

The zinc and copper salts of 2-amino-4(ethylthio)-butyric acid and 4(ethylthio)-2-hydroxybutyric acid were tested at 5000 parts per million for phytotoxicity to tomato and wheat plants, and the results showed no injury.

This application is a continuation-in-part of application Serial No. 519,236, filed June 30, 1955, by Robert J. Wineman and Richard S. Gordon, and of application Serial No. 570,417, filed March 9, 1956, by Robert J. Wineman, both now abandoned.

What is claimed is:

1. The method of controlling plant diseases caused by parasitic micro-organisms, which comprises contacting the plant host with a methionine analogue having the molecular structure:

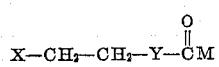

wherein X is a radical selected from the group consisting of $C_2H_5$—S—, $CH_3O$—, $C_2H_5O$—,

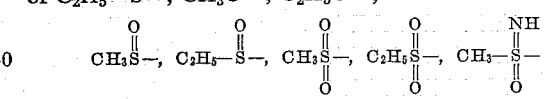

and

wherein M is a radical selected from the group consisting of —$NH_2$, —OH, —$ONH_4$, —OR of which R is an alkyl radical having up to three carbon atoms, and

of which Z is a metal of the group consisting of Na, K, Ca, Cu, Fe, Hg, Mn, Pb, Co, Ni and Cr, and of which V is the valence of said metal; and wherein Y is a divalent radical selected from the group consisting of:

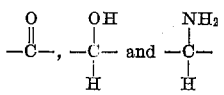

the quantity of said methionine analogue being such as to inhibit the said parasitic micro-organism but insufficient to produce a toxic effect on the plant host.

2. The method of controlling plant diseases caused by parasitic micro-organisms which comprises contacting the plant host with sodium-4-ethylthio-2-hydroxy butyrate in an amount sufficient to inhibit the parasite but insufficient to develop phytotoxicity in the plant host.

3. The method of controlling plant diseases caused by parasitic micro-organisms, which comprises contacting the plant host with a calcium salt of 4-ethylthio-2-hydroxybutyric acid in an amount sufficient to inhibit the parasite but insufficient to develop phytotoxicity in the plant host.

4. The method of controlling plant diseases caused by parasitic micro-organisms, which comprises contacting the plant host with a zinc salt of 4-ethylthio-2-hydroxybutyric acid in an amount sufficient to inhibit the parasite but insufficient to develop phytotoxicity in the plant host.

5. The method of controlling plant diseases caused by parasitic micro-organisms, which comprises contacting the plant host with a copper salt of 4-ethylthio-2-hydroxybutyric acid in an amount sufficient to inhibit the parasite but insufficient to develop phytotoxicity in the plant host.

6. The method of controlling plant diseases caused by parasitic micro-organisms, which comprises contacting the plant host with 4-ethylthio-2-hydroxybutyramide in an amount sufficient to inhibit the parasite but insufficient to develop phytotoxicity in the plant host.

References Cited in the file of this patent

UNITED STATES PATENTS 2,745,859    Norton _____ May 15, 1956

OTHER REFERENCES

Annual Review of Biochem., vol. XVIII, 1949, p. 545.
Chem. Abstracts: 1934, vol. 28, 6515(5); 1945, vol. 39, 1845(8); 1954, vol. 48, 4689(i).